(12) United States Patent  
Gutierrez et al.

(10) Patent No.: US 7,570,397 B2  
(45) Date of Patent: Aug. 4, 2009

(54) IMAGING SYSTEM AND METHOD TO ENABLE SCANNING A VARIETY OF TYPES OF MEDIA OBJECTS

(75) Inventors: Joseph Anthony Gutierrez, Thornton, CO (US); Michael A. Tregoning, Greeley, CO (US); James C. Dow, Ft. Collins, CO (US); Gregory Dale Merten, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 926 days.

(21) Appl. No.: 11/183,998

(22) Filed: Jul. 18, 2005

(65) Prior Publication Data

US 2007/0013986 A1   Jan. 18, 2007

(51) Int. Cl.
- *H04N 1/04* (2006.01)
- *H04N 1/46* (2006.01)
- *B65H 1/00* (2006.01)
- *G03B 27/58* (2006.01)
- *G03B 27/62* (2006.01)

(52) U.S. Cl. .................. 358/474; 358/506; 271/145; 271/162; 355/72; 355/75

(58) Field of Classification Search ................. 206/751, 206/737, 768, 425; 312/319.1; 269/87.1, 269/87.2, 88, 95; 399/108, 378; 358/487
See application file for complete search history.

(56) References Cited

U.S. PATENT DOCUMENTS

| | | | |
|---|---|---|---|
| 6,163,385 A | 12/2000 | Kajander | |
| 6,169,611 B1* | 1/2001 | Brook et al. | 358/487 |
| 6,185,011 B1 | 2/2001 | William | |
| 6,417,937 B1 | 7/2002 | Batten et al. | |
| 6,519,023 B1 | 2/2003 | Chang | |
| 6,614,563 B1 | 9/2003 | Batten et al. | |
| 6,850,344 B2* | 2/2005 | Chang | 358/487 |
| 2002/0075517 A1* | 6/2002 | Haining | 358/302 |
| 2002/0135819 A1* | 9/2002 | Sheng | 358/487 |
| 2003/0020970 A1* | 1/2003 | Haas et al. | 358/506 |
| 2003/0038987 A1* | 2/2003 | Khovaylo et al. | 358/474 |
| 2005/0046911 A1* | 3/2005 | Abundis et al. | 358/486 |

* cited by examiner

*Primary Examiner*—Twyler L Haskins  
*Assistant Examiner*—Barbara D Reinier (57) ABSTRACT

An imaging system comprises a base unit having a platen. The imaging system also comprises a lid coupled to the base unit and adapted to be disposed over the platen. The lid comprises a door openable relative to the lid to enable access to the platen therethrough.

31 Claims, 5 Drawing Sheets

IMAGING SYSTEM AND METHOD TO ENABLE SCANNING A VARIETY OF TYPES OF MEDIA OBJECTS

BACKGROUND OF THE INVENTION

Imaging systems, such as flatbed scanners and other types of imaging and/or scanning devices, are used to scan or otherwise generate an image from a variety of different types of media objects (e.g., magazines, documents, photographs, slides and/or film). However, using the imaging system for such varied media objects is generally a time-consuming, tedious, and often frustrating task. For example, closing a scanner lid over the media object may cause the media object to become skewed. However, the user generally is unaware of the skewed condition of the media object until after the scanning operation is complete, thereby requiring the user to re-position the media object and repeat the scanning operation, which becomes increasingly time-consuming for multiple media objects (e.g., a stack of photographs).

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-9C of the drawings, like numerals being used for like and corresponding parts of the various drawings.

Figures 1, 2:
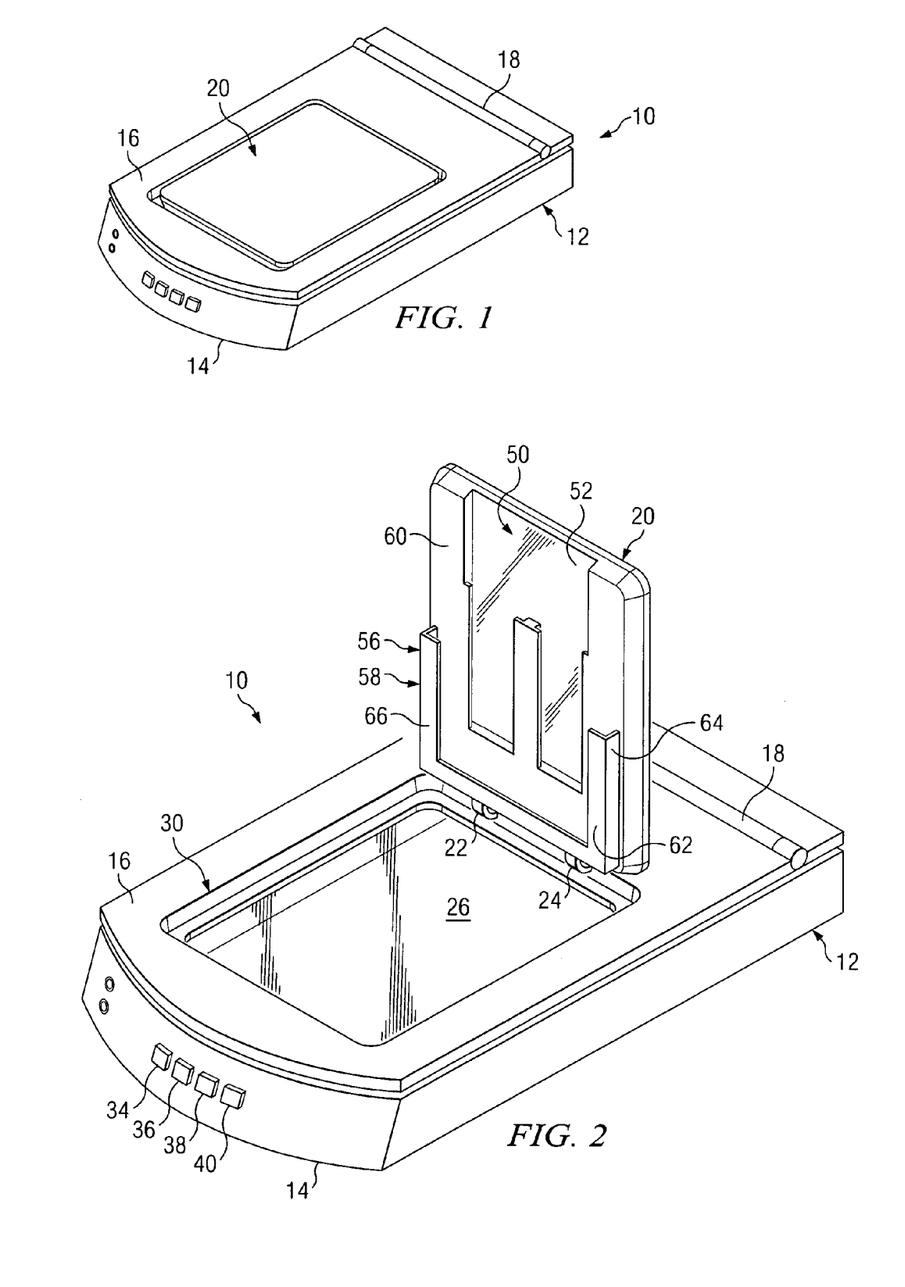
FIG. 1 is a diagram illustrating an embodiment of an imaging system in accordance with the present invention.
FIG. 2 is a diagram illustrating the imaging system of FIG. 1 with an embodiment of a door thereof in an open position.

FIG. 1 is a diagram illustrating an embodiment of an imaging system 10 in accordance with the present invention. In the embodiment illustrated in FIG. 1, imaging system 10 comprises a scanner 12. However, it should be understood that imaging system 10 may comprise any type of device for generating a scanned image of an object including, but not limited to, a facsimile device, scanner or copier, multi-function device or any combination thereof. In the embodiment illustrated in FIG. 1, imaging system 10 comprises a base unit 14 and a lid 16 movably coupled to base unit 14. For example, in the embodiment illustrated in FIG. 1, lid 16 is rotatably coupled to base unit 14 via a hinge assembly 18 to enable rotational movement of lid 16 relative to base unit 14. However, it should be understood that lid 16 may be otherwise coupled to base unit 14 to enable opening and closing of lid 16 relative to base unit 14. In the embodiment illustrated in FIG. 1, imaging system 10 also comprises a door 20 disposed within lid 16 and movable relative to lid 16 to enable opening and closing of door 20 relative to lid 16, thereby enabling access to platen 26 through lid 16 via door 20.

FIG. 2 is a diagram illustrating an embodiment of door 20 illustrated in FIG. 1 in an open position relative to lid 16 in accordance with the present invention. In the embodiment illustrated in FIG. 2, door 20 is rotatably coupled to lid 16 via hinge assemblies 22 and 24 to enable rotational movement of door 20 relative to lid 16 to facilitate opening and closing of door 20 relative to lid 16. However, it should be understood that door 20 may be otherwise coupled to lid 16 to enable opening and closing of door 20 relative to lid 16. Base unit 14 houses various elements for performing a scanning operation of a media object such as, but not limited to, an optical head, photosensitive elements, and a light source. In the embodiment illustrated in FIG. 2, base unit 14 also comprises a platen 26 for supporting various types of media objects thereagainst during a scanning operation. In operation, door 20 is movably coupled to lid 16 to enable access to at least a portion of platen 26 through lid 16 and for otherwise placing and/or positioning various types of media objects relative to platen 26 for a scanning operation on such as, but not limited to, photographs, slides and film or negatives.

Preferably, in some embodiments of the present invention, imaging system 10 is configured having hardware, software, or a combination thereof, to control and/or otherwise configure a scanning operation corresponding to a location of door 20, an opening 30 in lid 16 corresponding to a location of door 20 and/or a location or position of a particular type of media object relative to opening 30. For example, in some embodiments of the present invention, a scanner module or optical head disposed within base unit 14 is registered with a location of opening 30 and/or a location or position of various types of media objects when positioned relative to door 20 such that, based on a particular type of media object or particular scanning or imaging request made by a user, the scanner module performs a scan corresponding to a location of opening 30 and/or position of the particular type of media object, thereby limiting the area relative to platen 26 required to be scanned and decreasing the time for performing a scan. In some embodiments of the present invention, imaging system 10 comprises control mechanisms 34, 36, 38 and 40, each corresponding to a different type of scanning or imaging process based on a particular type of media object, a position of a particular media object within opening 30, or other type of scanning or imaging requests. Control mechanisms 34, 36, 38 and 40 may comprise buttons, touch pads, or any other type of device for receiving an input from a user. Thus, in operation, according to some embodiments of the present invention, each of control mechanisms 34, 36, 38 and 40 is registered or correspond to a particular type of media object or scanning request such that, in response to actuation of such control mechanisms 34, 36, 38 or 40, a scan is performed relative to platen 26 based on the respective actuated control mechanism 34, 36, 38 or 40. For example, control mechanism 34 may be registered or otherwise correspond to scanning of a photograph when such photograph is disposed within opening 30 relative to platen 26. Thus, actuation of control mechanism 34 causes the scanner module to only scan the area of platen 26 corresponding to the location of opening 30. However, it should be understood that system 10 may be otherwise configured for controlling the scanning process performed by the scanning module.

In the embodiment illustrated in FIG. 2, door 20 comprises a transparent media adapter 50 to enable imaging or scanning of transparent media objects via imaging system 10. For example, in the embodiment illustrated in FIG. 2, adapter 50 comprises a light source 52 disposed within door 20 for directing light through a transparent media object toward platen 26 and optical elements of imaging system 10.

In the embodiment illustrated in FIG. 2, door 20 also comprises a media holder 56 for holding and/or otherwise supporting a media object (e.g., either a transparent and/or non-transparent media object) relative to platen 26 during a scanning operation. For example, in the embodiment illustrated in FIG. 2, media holder 56 comprises a U-shaped support member 58 coupled to a side 60 of door 20 to facilitate supporting of media objects relative to platen 26 when door 20 is disposed in a closed position relative to lid 16 (as illustrated in FIG. 1). However, it should be understood that media holder 56 may be constructed having a different geometric configuration and/or be constructed to function or operate differently (e.g., being adjustable in an inwardly/outwardly or lateral direction to accommodate and/or adjust to different sizes of media objects). In the embodiment illustrated in FIG. 2, support member 58 comprises an L-shaped flange member 62 having a support wall 64 coupled to and disposed in a substantially perpendicular orientation relative to side 60 of door 20, and a support member 66 disposed substantially parallel to side 60 of door 20 and platen 26 for supporting media objects between support member 66 and side 60 of door 20. However, it should be understood that support member 58 maybe otherwise configured.

Figure 3:
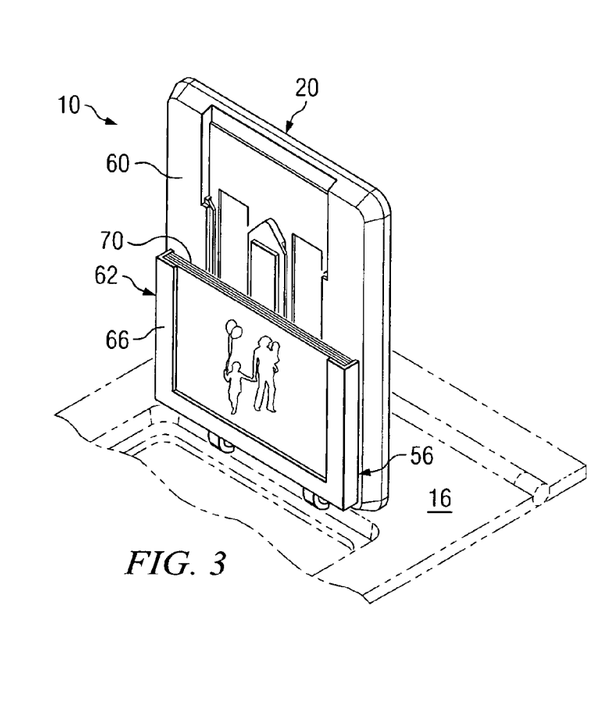
FIG. 3 is a diagram illustrating an embodiment of a door of the imaging system of FIG. 1 with media objects disposed thereon in accordance with the present invention.

FIG. 3 is a diagram illustrating door 20 of FIG. 2 having a stack of media objects 70 disposed within media holder 56. In the embodiment illustrated in FIG. 3, media objects 70 comprise non-transparent media objects 70 in the form of photographs. However, it should be understood that media holder 56 may be used to hold and/or otherwise support other types of media objects 70. As illustrated in FIG. 3, media objects 70 are disposed within media holder 56 between support member 66 of flange member 62 and side 60 of door 20 to support media object(s) 70 as door 20 is closed relative to lid 16 and during a scanning operation of media object(s) 70.

Figure 4A:
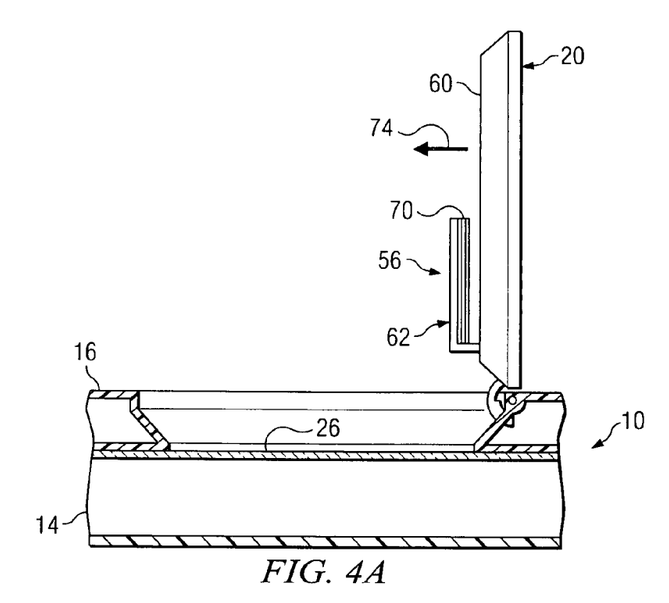
FIGS. 4A and 4B are diagrams illustrating a side view of an embodiment of a door of the imaging system of FIG. 1 in an open and closed position, respectively.
Figure 4B:
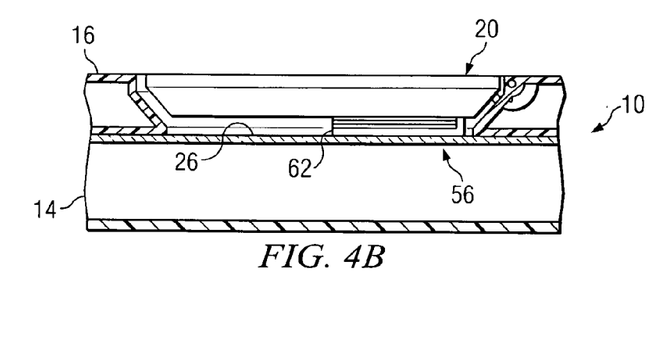

FIGS. 4A and 4B are diagrams illustrating a side view of door 20 in an open and closed position, respectively, relative to lid 16 in accordance with an embodiment of the present invention. In the embodiment illustrated in FIGS. 4A and 4B, media holder 56 is biased away from side 60 of door 20 in a direction indicated generally by 74 to facilitate placement of media object(s) 70 within media holder 56. Biasing of media holder 56 may be accomplished using spring(s) or any other type of device or element such that flange member 62 is biased away from side 60 of door 20 to facilitate placement of media object(s) 70 within media holder 56. Thus, in operation, in response to door 20 being moved from an open position relative to lid 16, as illustrated in FIG. 4A, to a closed position relative to lid 16, as illustrated in FIG. 4B, flange member 62 of media holder 56 contacts platen 26, thereby causing a compressive force opposite the biasing direction of media holder 56 and causing media holder 56 to retract at least partially into door 20 to facilitate retaining of media object(s) 70 in a substantially fixed position relative to platen 26 for a scanning operation (e.g., compressing media holder 56 and/or media object(s) 70 disposed therein). In the embodiment illustrated in FIGS. 4A and 4B, media holder 56 is illustrated as being coupled to door 20. However, it should be understood that in other embodiments of the present invention, media holder 56 may be coupled directly to lid 16 (e.g., lid 16 configured with or without door 20) such that media holder 56 is biased away from a side of the lid 16 facing platen 26 when lid 16 is in the closed position relative to platen 26, thereby enabling retraction of media holder 56 at least partially into lid 16 in response to closing of lid 16 relative to platen 26.

Figure 5:
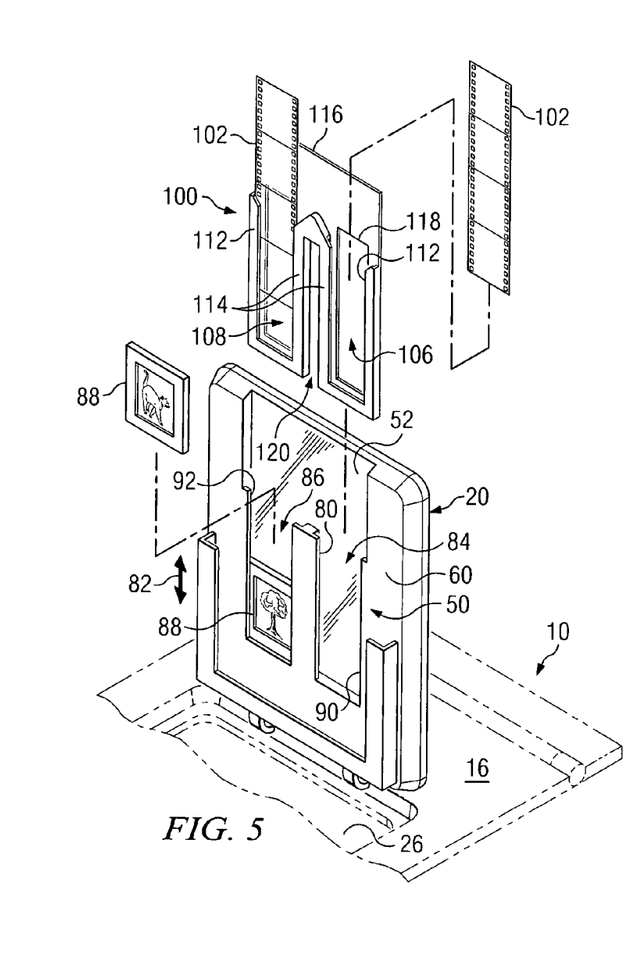
FIG. 5 is a diagram illustrating an embodiment of a door of the imaging system of FIG. 1 with a media holder in accordance with the present invention.

FIG. 5 is a diagram illustrating an embodiment of door 20 in accordance with the present invention. In the embodiment illustrated in FIG. 5, transparent media adapter 50 is configured to receive a variety of types of transparent media objects for imaging or scanning thereof. For example, in the embodiment illustrated in FIG. 5, door 20 comprises a medially disposed T-shaped rail 80 extending at least partially along a length of door 20 in the direction indicated generally by 82 to form two spaced apart channels 84 and 86 for receiving transparent media objects in the form of, for example, slides 88. In the embodiment illustrated in FIG. 5, side 60 of door 20 also comprises flanges 90 and 92 disposed opposite rail 80 relative to each channel 84 and 86, respectively, and spaced apart from light source 52 to facilitate slideable insertion and extraction of slides 88 relative to channels 84 and 86. Thus, in operation, slides 88 are insertable into channels 84 and/or 86, thereby positioning slides 88 between light source 52 and platen 26 when door 20 is in a closed position relative to lid 16 to facilitate imaging or scanning of slides 88. However, it should be understood that door 20 may be otherwise configured to accommodate scanning or imaging of slides 88.

In the embodiment illustrated in FIG. 5, door 20 is configured to cooperate with a transparent media holder 100 to accommodate scanning or imaging of transparent media objects in the form of, for example, film or negatives 102. For example, in the embodiment illustrated in FIG. 5, media holder 100 comprises two spaced apart channel members 106 and 108 each adapted to respectively cooperate with channels 84 and 86 of door 20 to facilitate slideable insertion of media holder 100 into channels 84 and 86. In the embodiment illustrated in FIG. 5, each channel member 106 and 108 comprises flanges 112 and 114 spaced apart from a support member 116 to facilitate slideable insertion of negatives 102 into respective channel members 106 and 108. In the embodiment illustrated in FIG. 5, support member 116 comprises an opening 118 formed therein corresponding to each channel member 106 and 108 to facilitate transmission of light from light source 52 therethrough towards negatives 102. Preferably, media holder 100 is formed from a transparent material. However, it should be understood that other types of materials may be used to form media holder 100. Thus, in operation, negatives 102 are insertable into channel members 106 and/or 108, and media holder 100 having negatives 102 disposed therein is insertable into channels 84 and 86 of door 20. As illustrated in the embodiment of FIG. 5, channel members 106 and 108 are spaced apart from each other to form a gap 120 therebetween for cooperating with rail 80 of door 20 to facilitate releasable engagement of media holder 100 with door 20. Additionally, in the embodiment illustrated in FIG. 5, media holder 100 is formed having a thickness to facilitate insertion of media holder between flanges 90 and 92 and light source 52. However, it should be understood that media holder 100 and/or door 20 may be otherwise cooperatively configured to facilitate secure placement of negatives 102 relative to light source 52 of door 20 for scanning or imaging of negatives 102.

Figure 6:
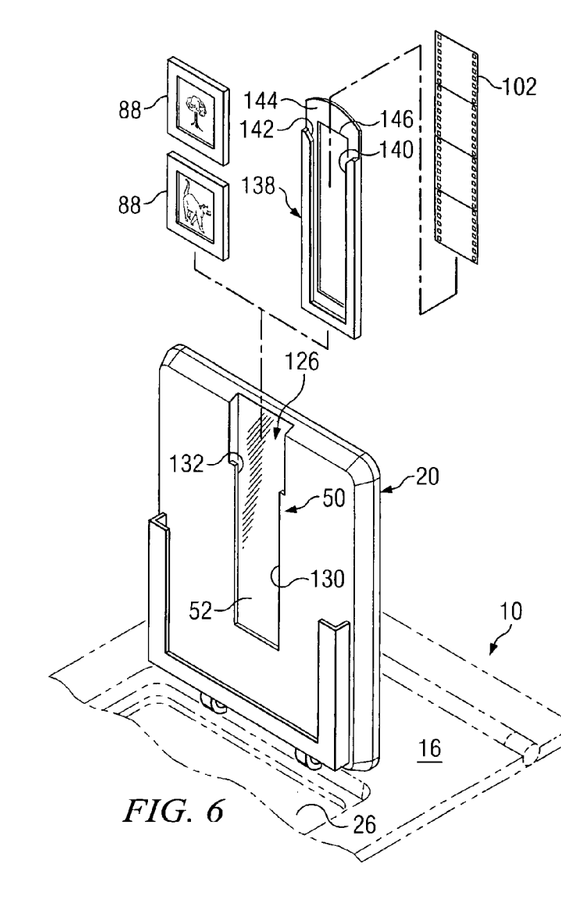
FIG. 6 is a diagram illustrating another embodiment of a door of the imaging system of FIG. 1 with a media holder in accordance with the present invention.

FIG. 6 is a diagram illustrating another embodiment of door 20 in accordance with the present invention. In the embodiment illustrated in FIG. 6, media adapter 50 comprises a single channel 126 disposed relative to light source 52 having flanges 130 and 132 on opposing sides thereof and spaced apart from light source 52 to facilitate insertion of slides 88 therein and/or a transparent media holder 138 therein. For example, in the embodiment illustrated in FIG. 6, media holder 138 comprises flanges 140 and 142 disposed opposite each other and spaced apart from a support member 144 to facilitate slideable insertion of negatives 102 therein. In the embodiment illustrated in FIG. 6, media holder 138 comprises an opening 146 formed in base member 144 to facilitate transmission of light therethrough from light source 52 through negatives 102. Thus, in operation, for scanning or imaging slides 88, slides 88 are insertable into channel 126, and for imaging or scanning negatives 102, negatives 102 are insertable into media holder 138 and, correspondingly, media holder 138 is insertable into channel 126.

Figure 7A:
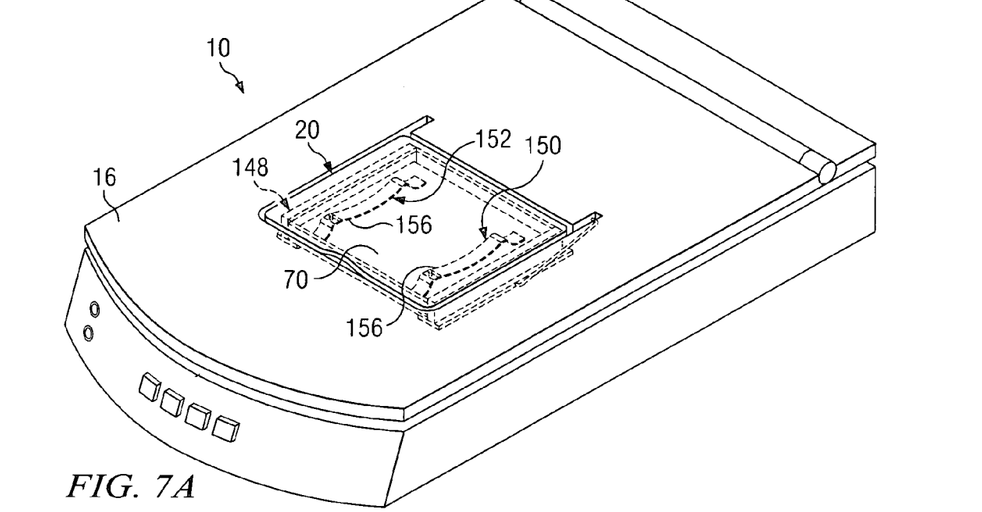
FIGS. 7A and 7B are diagrams illustrating another embodiment of a door of the imaging system of FIG. 1 in a closed and open position, respectively, in accordance with the present invention.
Figures 7B, 8:
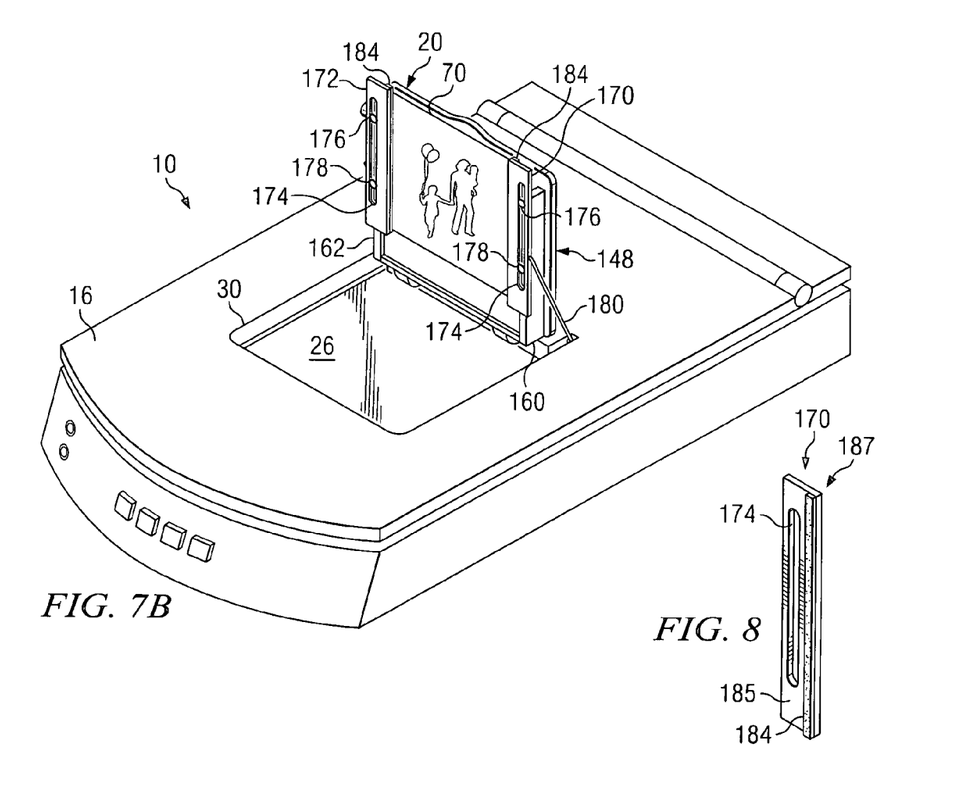
FIG. 8 is a diagram illustrating an embodiment of a push-up member of the door of FIGS. 7A and 7B in accordance with the present invention.

FIGS. 7A and 7B are diagrams illustrating another embodiment of door 20 of imaging system 10 in accordance with the present invention. In the embodiment illustrated in FIG. 7A, door 20 is disposed in the closed position relative to lid 16 to facilitate scanning or imaging of media objects disposed therein, and FIG. 7B illustrates door 20 in an open position relative to lid 16. As best illustrated in FIG. 7A, door 20 comprises a media holder 148 having two spaced apart biasing elements 150 and 152 to facilitate biasing of media objects 70 towards platen 26 (as illustrated in FIG. 7B) during a scanning or imaging operation. In the embodiment illustrated in FIG. 7A, biasing elements 150 and 152 each comprise a flexible clip member 156. However, it should be understood that other types of devices or methods may be used to bias media objects 70 towards platen 26. Further, biasing elements 150 and 152 secure media objects 70 in a relatively fixed position within door 20 during a scanning or imaging operation.

In the embodiment illustrated in FIG. 7B, media holder 148 comprises two spaced apart flange members 160 and 162 to facilitate placement of media objects 70 therebetween within door 20. In the embodiment illustrated in FIG. 7B, media holder 148 also comprises push-up members 170 and 172 spaced apart from each other and located on opposite sides of media objects 70. Push-up members 170 and 172 each comprise a slot 174 disposed therein and adapted to cooperate with pin members 176 and 178 coupled to flange members 160 and 162 to facilitate slideable engagement of push-up members 170 and 172 relative to respective flange members 160 and 162. Each of push-up members 170 and 172 are coupled to lid 16 via a respective arm 180. Each arm 180 is rotatably coupled to lid 16 to facilitate rotational movement of door 20 between an open and closed position relative to lid 16. Additionally, in the embodiment illustrated in FIG. 7B, each push-up member 170 and 172 comprises a frictional element 184 for engaging at least a portion of a media object 70 to facilitate ejection of a particular media object 70 in response to opening of door 20 relative to lid 16.

FIG. 8 is a diagram illustrating an embodiment of push-up member 170 of FIGS. 7A and 7B. It should be understood that push-up member 172 is correspondingly configured. In FIG. 8, push-up member 170 is disposed in an orientation opposite than illustrated in FIG. 7B to facilitate viewing of a side 185 of push-up member 170 configured to face media objects 70 in media holder 148. In the embodiment illustrated in FIG. 8, push-up member 170 comprises frictional element 184 coupled to side 185 of push-up member 170 to face media objects disposed within media holder 148 (FIGS. 7A and 7B). Preferably, frictional element 184 is formed from a rubber or elastomeric material having a non-slick surface to facilitate engagement thereof with a media object disposed within media holder 148. However, it should be understood that frictional element 184 may be formed using other materials. In the embodiment illustrated in FIG. 8, frictional element 184 is disposed along an edge 187 of push-up member 170 to facilitate engagement of a peripheral or edge portion of a media object disposed within media holder 148. In the embodiment illustrated in FIG. 8, frictional element 184 extends the entire length of push-up member 170 along edge 187. However, it should be understood that frictional element 184 may be configured having other sizes (e.g., length and/or width) and/or may be disposed at other locations on push-up member 170.

Figures 9A, 9B:
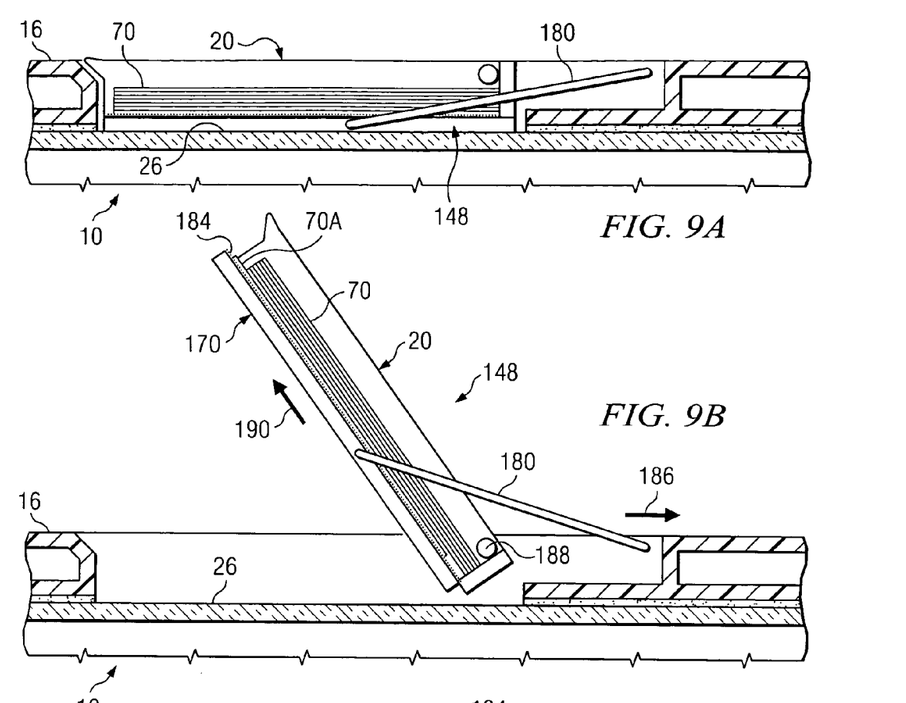
FIGS. 9A-9C are diagrams illustrating the operation of the door of FIGS. 7A and 7B in accordance with the present invention.
Figure 9C:
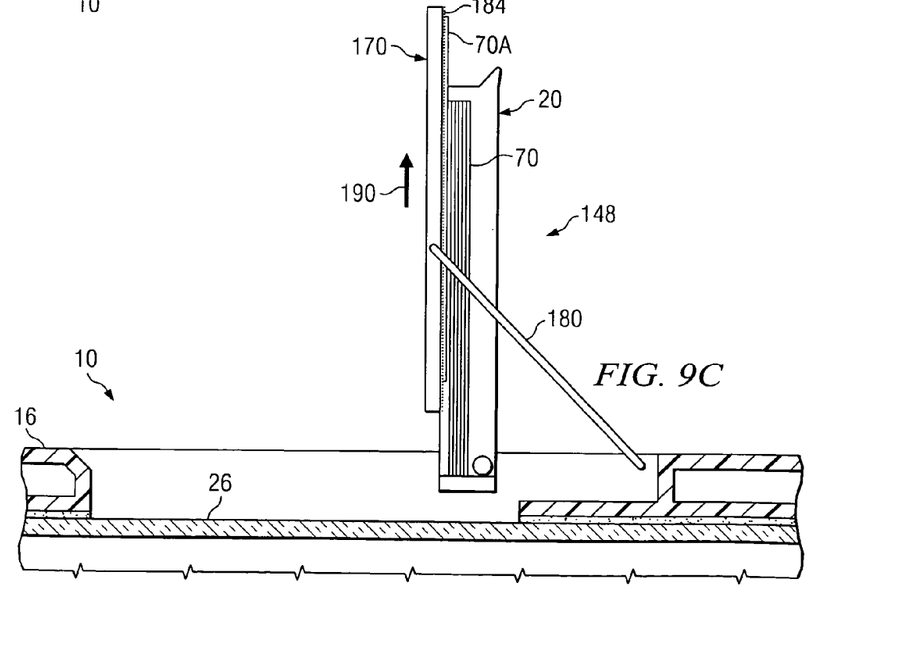

FIGS. 9A-9C are diagrams illustrating the operation of door 20 and media holder 148 of FIGS. 7A and 7B in accordance with the present invention. In the embodiment illustrated in FIGS. 9A-9C, a stack of media objects 70 (e.g., non-transparent media objects in the form of photographs) are disposed within media holder 148. FIG. 9A illustrates door 20 in the closed position relative to lid 16 to facilitate scanning or imaging of a particular media object 70 disposed closest to platen 26. In FIG. 9B, door 20 is illustrated in a partially opened position relative to lid 16. As illustrated in FIG. 9B, arm 180 is coupled to lid 16 in a location rearwardly (indicated generally by 186) of an axis of rotation of door 20 relative to lid 16, indicated generally by 188. Thus, in operation, in response to opening of door 20 relative to lid 16, arm 180 causes slideable movement of push-up member 170 in the direction indicated generally by 190. Frictional element 184 of push-up member 170 engages a portion of a media object 70A located within the stack of media objects 70 disposed closest to platen 26 to facilitate ejection of media object 70A in response to opening of door 20 relative to lid 16.

Thus, in operation, a stack of media objects 70 is placed in media holder 148 and door 20 closed to facilitate scanning of media object 70A (e.g., since media object 70A is located closest to platen 26 with remaining media objects 70, if any, disposed behind media object 70A). After scanning of media object 70A, opening of door 20 causes movement of push-up member 170 in the direction indicated generally by 190. Frictional element 184 engages a portion of media object 70A to facilitate at least partial ejection of media object 70A relative to the remaining media objects 70 in the media holder 148, thereby facilitating easy removal of media object 70A from the stack of media objects 70. After removal of media object 70A, a next media object 70 of the stack is in position for scanning and, correspondingly, upon closing of door 20 relative to platen 26, scanning of the next media object 70 of the stack may be performed.

In FIG. 9C, door 20 is illustrated in a substantially open position relative to lid 16. As illustrated in the embodiment of FIG. 9C, media object 70A is at least partially ejected relative to remaining media object(s) 70 located within media holder 148 to facilitate easy removal of media object 70A from the stack of media object(s) 70 remaining within media holder 148. For ease of illustration and description, the operation of door 20 and/or media holder 148 described above with reference to FIGS. 9A-9C refers only to push-up member 170 resulting from a side view of door 20 and media holder 148. However, it should be understood that push-up member 172 functions in a similar manner as described above for push-up member 170.

Thus, embodiments of the present invention enable a user to efficiently and easily scan a variety of types of media objects. For example, embodiments of the present invention enable a variety of types of media objects to be placed in door 20, either individually, in groups or sets, and either alone or within a holder or carrier (e.g., media holder 100). Further, embodiments of the present invention facilitate positioning of media objects for a scanning operation that reduces or substantially eliminates movement or skewing of such media objects. For example, placement of media objects in door 20 (e.g., via holders 56, 100, 138 and/or 148 and/or adapter 50) securely positions such media objects relative to platen 26 during a scanning operation.

What is claimed is:

1. An imaging system, comprising:
   a base unit having a platen; and
   a lid coupled to the base unit and adapted to be disposed over the platen, the lid having a door openable relative to the lid to enable access to the platen therethrough;
   wherein the door comprises one or more of a media holder:
   adapted to hold a plurality of objects to be imaged in a stacked relationship relative to each other;
   adapted to at least partially eject at least one object from a stack of a plurality of objects; and
   biased in a direction toward the platen when the door is in a closed position relative to the platen.

2. The system of claim 1, wherein the door further comprises a transparency media adapter.

3. The system of claim 1, wherein the door further comprises a non-transparency media holder.

4. The system of claim 1, wherein the door comprises a media holder adapted to hold a plurality of objects to be imaged in a stacked relationship relative to each other.

5. The system of claim 1, wherein the door comprises a media holder adapted to at least partially eject at least one object from a stack of a plurality of objects.

6. The system of claim 1, wherein the door comprises a media holder adapted to at least partially eject at least one object from a stack of a plurality of objects in response to opening of the door relative to the lid.

7. The system of claim 1, wherein the door further comprises a transparency media holder adapted to accommodate at least two different types of transparent media objects.

8. The system of claim 1, wherein the door is rotatably coupled to the lid.

9. The system of claim 1, wherein the imaging system is adapted to perform a scan in a predetermined location corresponding to a location of the door.

10. The system of claim 1, wherein the door further comprises a transparent media adapter adapted to receive a media holder.

11. The system of claim 1, wherein the door comprises a media holder biased in a direction toward the platen when the door is in a closed position relative to the platen.

12. An imaging system, comprising:
    a lid coupled to a base unit, the lid having a biased media holder integrally coupled thereto and disposed to face a platen of the base unit when the lid is in a closed position relative to the base unit.

13. The system of claim 12, wherein the media holder is adapted to hold a plurality of objects in a stacked relationship to each other.

14. The system of claim 12, wherein the lid further comprises a transparency media adapter.

15. The system of claim 12, wherein the media holder is adapted to retract in response to contacting the platen.

16. The system of claim 12, wherein the media holder is biased away from the lid.

17. An imaging system, comprising:
    a lid adapted to cover a platen of a base unit; and
    a door openable relative to the lid, the door adapted to at least partially eject at least one object from a stack of a plurality of objects in response to opening of the door relative to the lid.

18. The system of claim 17, wherein the door comprises a media holder adapted to hold the plurality of stacked objects.

19. The system of claim 17, wherein the door comprises at least one frictional element adapted to engage the at least one object to eject the at least one object.

20. The system of claim 17, wherein the door is rotatably coupled to the lid.

21. The system of claim 17, wherein the door is adapted to dispose at least one of the plurality of objects facing the platen when the door is in a closed position relative to the lid.

22. An imaging system, comprising:
    means for covering a platen of a base unit in a reflective scanning mode; and
    means openable relative to the covering means for enabling access to the platen through the covering means;
    wherein the access means comprises one or both of:
    means for at least partially ejecting at least one object from a stack of a plurality of objects in response to opening of the access means relative to the covering means; and
    means coupled to the access means for holding at least one object, the holding means biased away from the access means.

23. The system of claim 22, wherein the access means further comprises means for holding at least one transparent media object.

24. The system of claim 22, wherein the access means comprises means for at least partially ejecting at least one object from a stack of a plurality of objects in response to opening of the access means relative to the covering means.

25. The system of claim 22, wherein the access means comprises means coupled to the access means for holding at least one object, the holding means biased away from the access means.

26. A method of manufacturing an imaging system, comprising:
    providing a base unit having a platen;
    coupling a lid to the base unit, the lid having a door openable relative to the lid to enable access to the platen therethrough; and
    one or more of providing the door:
    adapted to hold a plurality of objects to be imaged in a stacked relationship relative to each other;
    adapted to at least partially eject at least one object from a stack of a plurality of objects;
    adapted to at least partially eject at least one object from a stack of a plurality of objects in response to opening of the door relative to the lid; and
    having a media holder biased in a direction toward the platen.

27. The method of claim 26, further comprising providing the door having a transparency media adapter.

28. The method of claim 26, further comprising providing the door having a non-transparency media holder.

29. The method of claim 26, further comprising providing the door adapted to accommodate at least two different types of transparent media objects.

30. The method of claim 26, further comprising rotatably coupling the door to the lid.

31. The method of claim 26, further comprising providing the door having a transparent media adapter adapted to receive a media holder.

* * * * *